(12) United States Patent
Collins

(10) Patent No.: US 6,619,661 B1
(45) Date of Patent: Sep. 16, 2003

(54) JIGSAW PUZZLES FOR PRACTICING ARITHMETIC

(76) Inventor: Stanley Collins, 1312 Jeppesen Ave., Eugene, OR (US) 97401

( * ) Notice: Subject to any disclaimer, the term of this patent is extended or adjusted under 35 U.S.C. 154(b) by 0 days.

(21) Appl. No.: 10/177,487

(22) Filed: Jun. 20, 2002

(51) Int. Cl.[7] ............................................. A63F 9/10
(52) U.S. Cl. ................................. 273/157 R; 434/208
(58) Field of Search ........................ 273/157 R, 156; 434/171, 172, 208

(56) References Cited

U.S. PATENT DOCUMENTS

| | | | | |
|---|---|---|---|---|
| 1,276,344 A | * | 8/1918 | Gilman | 273/157 R |
| D96,215 S | * | 7/1935 | Bambaci | 273/157 R |
| 2,443,468 A | * | 6/1948 | Madden | 273/157 R |
| 2,647,330 A | * | 8/1953 | Ford | 273/157 R |
| 2,875,531 A | | 3/1959 | Mansfield | |
| 4,360,347 A | | 11/1982 | Ghaznavi | |
| 4,422,642 A | | 12/1983 | Fletcher | |
| D275,870 S | * | 10/1984 | Koehn | 273/157 R |
| 4,629,431 A | * | 12/1986 | Sanders | 273/157 R |
| 4,776,802 A | * | 10/1988 | Rind et al. | 273/157 R |
| 5,743,741 A | | 4/1998 | Fife | |
| 6,024,360 A | * | 2/2000 | Orbach et al. | 273/157 R |

\* cited by examiner

*Primary Examiner*—Steven Wong
(74) *Attorney, Agent, or Firm*—Robert E. Howard

(57) ABSTRACT

Jigsaw puzzles for use by young children to practice elementary arithmetic. Each puzzle is circular and includes a center piece, four middle ring question pieces, and twelve outer ring answer pieces. One side of each puzzle contains the arithmetic question and answer pieces and the other side forms a picture when the question and answer pieces are put together correctly. A transparent tray is used for assembling the pieces of the puzzle. A transparent cover is adapted to be snapped into place over the tray and allow the container to be turned over to view the picture side to determine if the picture is either (1) correct, which means that all of the arithmetic questions have been answered correctly or (2) incorrect, which means that some or all of the arithmetic questions have not been answered correctly.

11 Claims, 5 Drawing Sheets

JIGSAW PUZZLES FOR PRACTICING ARITHMETIC

BACKGROUND OF THE INVENTION

This invention relates to jigsaw puzzles for use by young children as an aid to learning elementary arithmetic, i.e., addition, substraction, multiplication and division.

A number of puzzle devices for teaching elementary mathematics to young children have been proposed.

U.S. Pat. No. 4,360,347 describes a mathematical educational game device. The embodiment illustrated in FIGS. 1–3 is in the form of a circular puzzle having a plurality of pieces 15. The puzzle has no center piece (being open in the middle) and a plurality of wedge-shaped puzzle members 15. Numbers or arithmetic operators are printed on one side of the puzzle members 15. Each radial column is comprised of four pieces, the outer row containing a number, the next inner row containing an arithmetic operator, the next inner row containing the question number and the inner row containing the answer number. Problems can also be similarly presented and solved within each circumferential row.

U.S. Pat. No. 2,875,531 describes an educational device of interlocked puzzle pieces 15. A frame 10 is comprised of frame members 11 enclosing a front transparent window 12 set in slots 13. A rear cover 16 is inserted into slots 17. The puzzle pieces 15 are put together following the instructions contained on the rear cover 16 of frame 10, reading down the left column first and then moving down the right column. The puzzle pieces 15 are put together moving always in a clockwise direction, forming the border first. Where, for example, the instructions call for "1+1", the student places the puzzle piece 15 containing the number "2". When the puzzle pieces are put together properly, a picture 14 is formed on the side of the puzzle opposite to the answer side of pieces 15. It does not appear that the pieces 15 could be interlocked together other than in the correct way. The picture 14 is not used to check the answers selected; it is merely the product of putting the puzzle together as in any jigsaw puzzle.

U.S. Pat. No. 4,422,642 describes an educational puzzle for various skills, including mathematics. The puzzle, when assembled, is rectangular in shape. In the embodiments illustrated in FIGS. 1 and 2, there are three rows and three columns of interlocking puzzle pieces containing arithmetic questions and answers in both the horizontal rows and vertical columns. In the embodiment of FIG. 2, the three columns are color coded. The pieces can be interlocked in only one way, i.e., they cannot be assembled to proved wrong answers.

U.S. Pat. No. 5,743,741 describes a math jigsaw puzzle. The puzzle, when assembled, is rectangular in shape. Although several embodiments are described, they all operate on the same principal as that shown in FIGS. 1A–1L in which one starts with a center piece 24 which has a central number in large print surrounded by four equally spaced numbers in smaller print (see FIG. 1-F). One then interlocks a piece 30 to the center piece 24 to solve the problem presented by the central number and adjacent surrounding number of the center piece, as shown in FIG. 1-G. Each added piece 30 presents a new math problem which is solved by interlocking a further solution piece, as shown in FIGS. 1-H through 1-L. The pieces can be interlocked in only one way, i.e., they cannot be assembled to provide wrong answers.

A problem with all of these prior art puzzles is that none of them can have their pieces interlocked together to provide a wrong answer and a way to clue the child that his/her answer is wrong, thereby causing the child to re-think and re-work his wrong answer. It is an object of the present invention to provide such a math teaching puzzle.

SUMMARY OF THE INVENTION

The present invention relates to four sets of jigsaw puzzles designed to assist young children in learning elementary arithmetic. One of the four sets is designed to aid in learning elementary addition, one set for elementary subtraction, one set for elementary multiplication, and one set for elementary division. Each set is comprised of a plurality of puzzles of varying complexity. Preferably a set is comprised of ten puzzles which provides a separate puzzle for arithmetic questions involving operating numbers selected from 1 through 10.

Each puzzle is circular and essentially two dimensional. Each puzzle is comprised of a center piece, four middle ring question pieces, and twelve outer ring answer pieces.

One side of each puzzle contains the arithmetic question and answer pieces and the other side forms a picture when the question and answer pieces are put together correctly. The printed pattern forming the background to the question side of the puzzle is preferably different for each puzzle so pieces cannot be inadvertently mixed up.

Each puzzle comes in a container that includes a transparent tray and transparent cover. The transparent tray is for assembling the pieces of the puzzle. The transparent cover is adapted to be snapped into place over the tray and allow the container to be turned over to view the picture side and determine if the picture is either (1) assembled properly (which means that all of the arithmetic questions have been answered correctly) or (2) assembled improperly (which means that some or all of the arithmetic questions have not been answered correctly).

The circular center piece contains twelve evenly spaced apart and different numbers ("operands") located adjacent its periphery. The center piece has a peripheral keying projection adjacent one of the operand numbers. The four middle ring question pieces have concave inner sides that constitute a chord having a length that is one fourth the circumference of the circular center piece. The concave inner sides are adapted to matingly fit against the outer periphery of the center piece, with the concave inner side of one of the four pieces (the "keystone piece") having a keying recess adapted to receive the keying projection extending from the center piece. The sides of the four middle ring question pieces have convexities (tabs) and concavities (recesses) of varying shapes with the tabs of one piece being adapted to be interlocked to a mating recess of an adjacent piece. Thus, the keystone piece fits at only one location adjacent the center piece (with the center piece keying projection being received into the mating keying recess of the keystone piece) while the user needs to place the other three question pieces in specific locations so that the sides of adjacent pieces interlock.

Each of the question pieces have arithmetic questions located radially adjacent each of the operand numbers located on the center piece. The arithmetic questions include an operator sign (+, −, ×, or ÷) followed by an operator number (preferably selected from 1 through 10) and an equal (=) sign. For each puzzle the arithmetic questions are all identical. For example, all of the arithmetic questions appearing on the question pieces of one puzzle in the addition set will contain the math question "+1=", which questions are located radially adjacent the operand numbers on the center piece.

The outer edge (periphery) of each of the four question pieces contain three identical convex tabs extending therefrom, each tab being an identical arc of a circle.

The twelve outer ring answer pieces are identical in shape, with a concave inner edge (recess) adapted to interfit with each and every one of the convex tabs of the question pieces. Thus, the user must interfit the concave recess of the answer piece to the convex tab of the question piece that the user believes supplies the correct answer. For example, if the center piece had the operand number "11" followed by the arithmetic question "+1" radially adjacent on the question piece, the correct answer piece would be the one having the number "12" located thereon. However, since the outer ring answer pieces are all identical in shape, it is possible to interfit an outer ring answer piece containing the wrong answer to the arithmetic question located on the question piece.

After the child has interfit all of the puzzle pieces together, he/she can snap the transparent container cover onto the transparent container tray and turn the puzzle container over to see if the picture on the other side is correct. If correct, it means that the user has selected all of the correct answers to the questions. If the picture is not correct, it means that the user has selected two or more wrong answers.

DESCRIPTION OF PREFERRED EMBODIMENTS

As mentioned previously, the present invention is comprised of four sets of jigsaw puzzles, one of the four sets being designed to assist in learning elementary addition, one set for elementary substraction, one set for elementary multiplication, and one set for elementary division. Each set is comprised of a plurality of puzzles, preferably ten.

Figure 1:
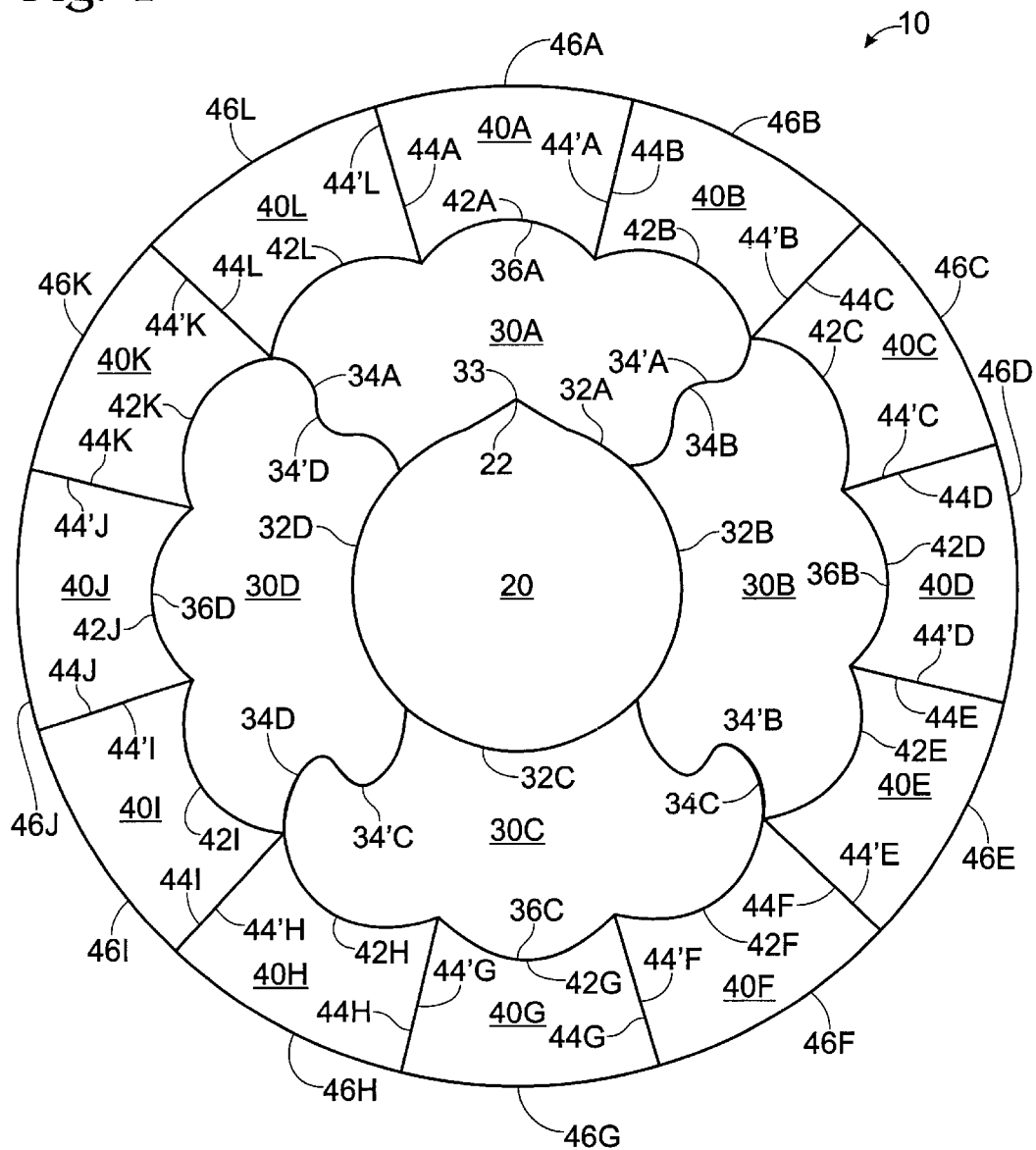
FIG. 1 is a top plan view of the arithmetic jigsaw puzzle of the present invention with the interfitted pieces left blank to show the shapes of the center piece, middle ring question pieces and outer ring answer pieces.
Figure 2:
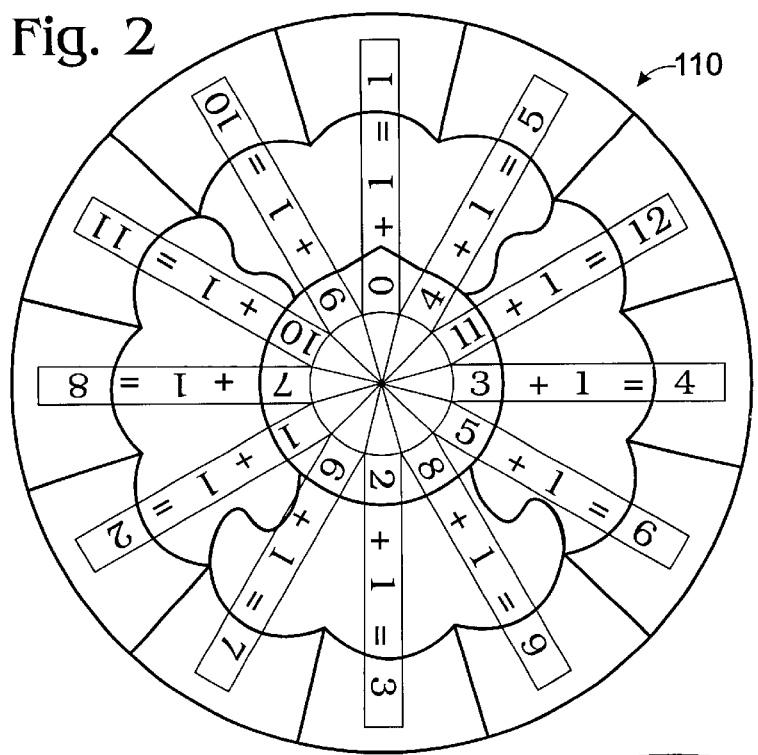
FIG. 2 is a top plan view of the arithmetic jigsaw puzzle of the present invention, illustrating an addition puzzle.
Figure 3:
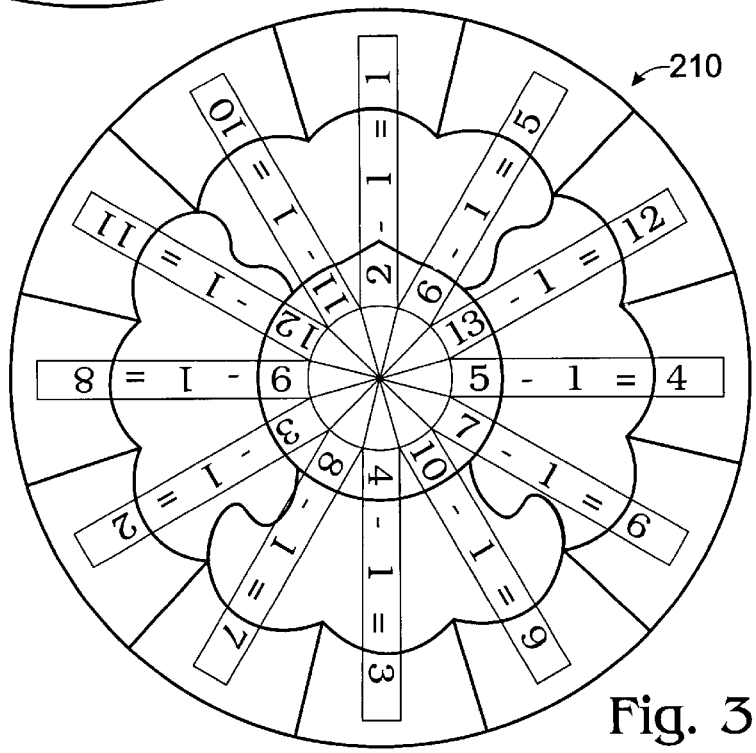
FIG. 3 is a top plan view of the arithmetic jigsaw puzzle of the present invention, illustrating a substraction puzzle.
Figure 4:
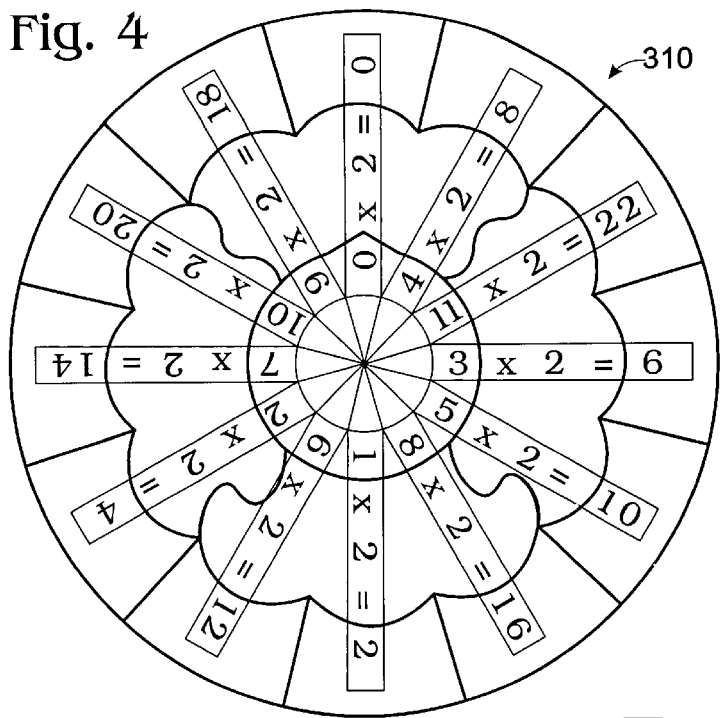
FIG. 4 is a top plan view of the arithmetic jigsaw puzzle of the present invention, illustrating a multiplication puzzle.
Figure 5:
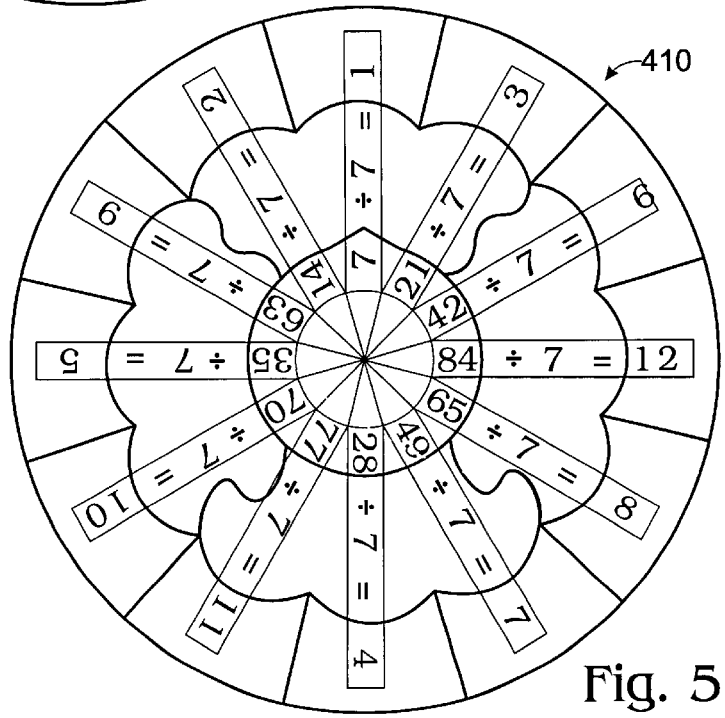
FIG. 5 is a top plan view of the arithmetic jigsaw puzzle of the present invention, illustrating a division puzzle.

FIG. 1 is a top plan view of puzzle 10 showing the various pieces interfitted without the presence of any arithmetic problems.

Puzzle 10 with all of its pieces interfitted is circular and comprised of a center piece 20, four middle ring question pieces 30A–30D, and twelve outer ring answer pieces 40A–40L.

The center piece 20 is circular shaped with a generally triangular shaped indexing finger 22 projecting from the periphery thereof.

The four middle ring question pieces 30A–30D have concave inner sides 32A–32D, respectively that constitute a chord having a length that is one fourth the circumference of the circular center piece 20. The concave inner sides 32A–32D are adapted to matingly fit against the outer periphery of the center piece 20. The concave inner side of middle ring question piece 30A (the "keystone piece") has an indexing recess 33 adapted to receive the indexing finger 22 extending from the center piece 20.

The first sides 34A–34D and the second sides 34'A–34'D of the four middle ring question pieces 30A–30D, respectively, have convexities (tabs) and concavities (recesses) of varying shapes with the tabs of one question piece 30 being adapted to be interfit with a mating recess of an adjacent question piece 30.

The keystone question piece 30A fits at only one location adjacent the center piece 20 with the center piece 20 indexing projection 22 being received into the mating indexing recess 33 of the keystone piece 30A. The user needs to place the other three question pieces 30B–30D in specific locations so that the sides of adjacent pieces interfit. Although all of the question pieces of a particular puzzle 10 carry identical arithmetic questions, the purpose of requiring the question pieces 30 to have different shapes and able to be placed only in specific locations about center piece 20 is so that the picture appearing on the bottom face of puzzle 10 will be correct insofar as the center piece 20 and question pieces 30 are concerned.

The outer edges (periphery) 36A–36D of each of the four question pieces 30A–30D, respectively, contain three identical convexities (tabs) extending therefrom, each tab being an identical arc of a circle.

The twelve outer ring answer pieces 40A–40L are identical in shape, each having a concave inner edge (recess) 42A–42L, respectively, adapted to interfit with any of the convex tabs of the question pieces 30A–30D.

First sides 44A–44L and second sides 44'A–44'L of answer pieces 40A–40L, respectively, are angled as shown, and if extended inwardly would all meet at the center of circular center piece 20.

The outer edges 46A–46L of answer pieces 40A–40L, respectively, are all identical and are an arc of the circle formed by puzzle 10, the length of each arc being 1/12th the circumference of the circular puzzle 10.

The center piece 20 has twelve evenly spaced apart operand numbers printed thereon. The operand numbers are the numbers that are to be operated upon by arithmetic questions located in radial alignment therewith on the question pieces 30A–30D. In multiplication the operand number would be called the "multiplicand"; in division the operand number would be called the "dividend".

Each of the four question pieces 30A–30D is situated opposite three adjacent operand numbers located on the center piece 20. Therefore, each of the four question pieces 30A–30D have three arithmetic questions printed thereon, each in radial alignment with an operand number located on center piece 20.

Each of the arithmetic questions contains three elements.

The first element in the arithmetic question is the arithmetic operator sign, i.e., either an addition sign (+), subtraction sign (−), multiplication sign (×) or division sign (÷). For a given puzzle, the arithmetic operator sign is the same for all twelve arithmetic questions, i.e., the puzzle is either an addition puzzle, subtraction puzzle, multiplication puzzle or division puzzle.

The second element in the arithmetic question is an "operator" number that is to be added to, subtracted from, multiplied times or divided into the operand number. In multiplication this operator number would be called the "multiplier"; in division this operator number wold be called the "divisor". For each puzzle, all of the operator numbers are identical.

The third element in the arithmetic question is always an equal sign (=)

Each of the twelve outer ring answer pieces 40A–40L contain only a single number, an "answer" number. Since outer ring answer pieces 40a–40L all have identical shapes and each can be abutted in radial alignment with any of the twelve arithmetic questions printed on the four question pieces 30A–30D, wrong answers can be selected for two or more of the arithmetic questions.

FIGS. 2–5 show examples of an addition puzzle 110, subtraction puzzle 210, multiplication puzzle 310, and division puzzle 410, respectively.

Figure 7:
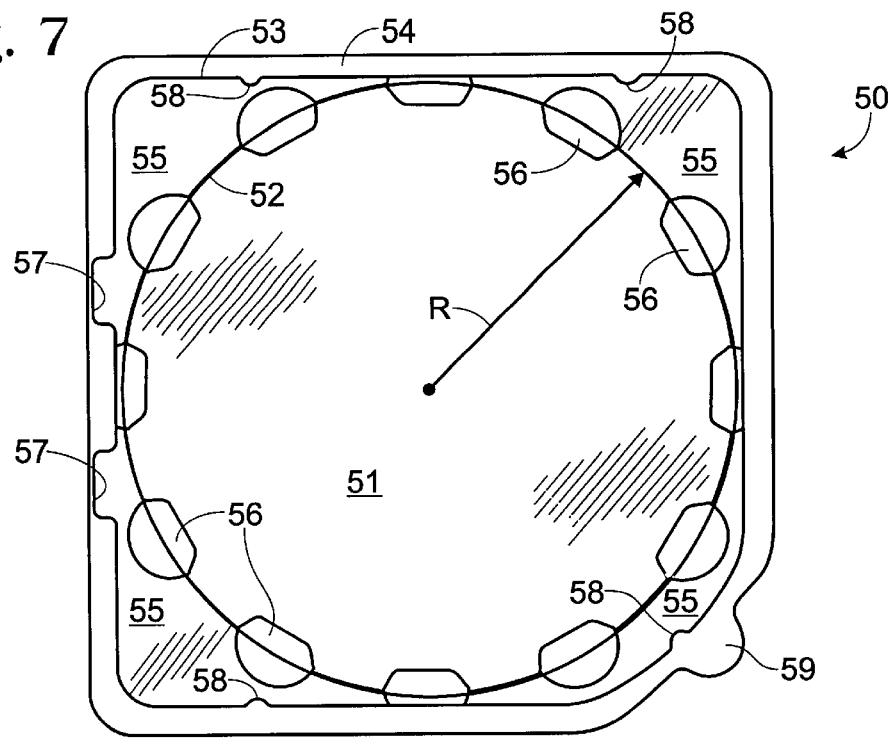
FIG. 7 is plan view of the inside of the container tray used to hold the puzzle pieces as they are interfitted together.

FIG. 7 shows a transparent tray 50 into which are placed the various puzzle pieces. Tray 50 is generally rectangular in shape, but has one corner that is rounded. Tray 50 includes a tray floor 51 and a circular inner wall 52 extending upwardly from tray floor 51. The circular inner wall 52 has a radius "R" equal to the radius of puzzle 10. An outer wall 53 has a flange 54 extending outwardly from the bottom thereof. Shelves 55 are formed between the top of outer wall 53 and the top of inner wall 52. Twelve finger recesses 56 are formed in inner wall 52 and floor 51. Large lock tabs 57 are formed in outer wall 53. A plurality of small lock recesses 58 are formed in outer wall 53. Tray unlocking tab 59 extends outwardly from that portion of flange 54 located in the rounded corner of tray 50.

Center piece 20 would be placed at the center of the floor 51 of tray 50, keystone piece 30A having the indexing recess 33 would be placed so that indexing finger 22 is inserted into indexing recess 33, and the remaining three question pieces 30B–30D would be placed where their respective sides can be properly interfitted into place. Finally, answer piece 40 deemed to contain the correct answer for each arithmetic question would be selected from amongst the answer pieces 40A–40L and fitted into radial alignment with that arithmetic question.

Figure 8:
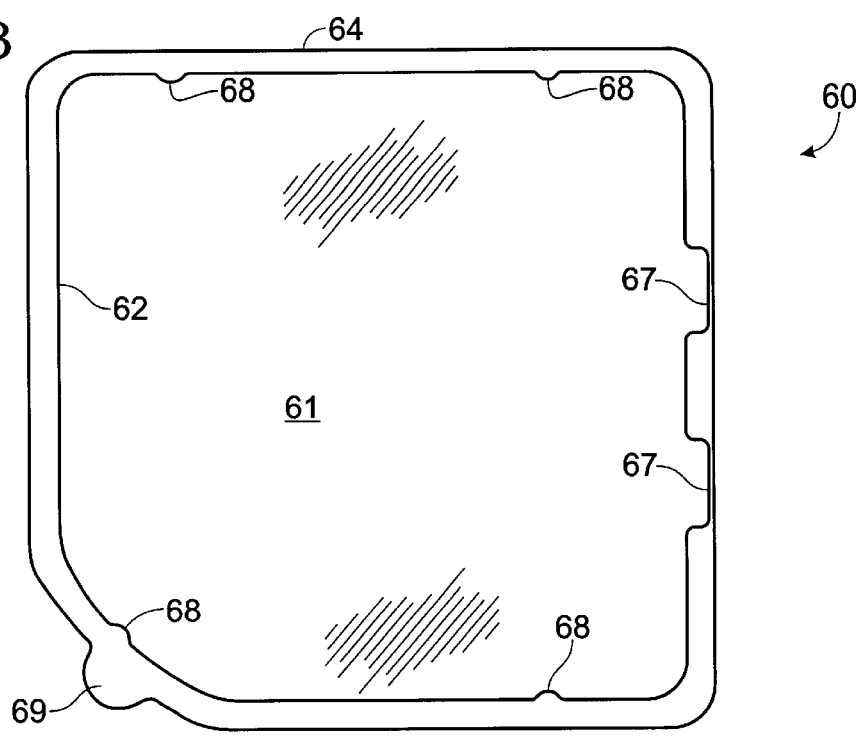
FIG. 8 is a plan view of the inside of the container cover which snaps onto the container tray to form a puzzle container which can be turned over to examine the picture on the side of the puzzle opposite to that side having the arithmetic questions and answers.

Transparent cover piece 60, shown in FIG. 8, is generally rectangular in shape but has one corner thereof that is rounded. Cover piece 60 includes an inner top surface 61, side wall 62 extending upwardly from inner top surface 61, and flange 64 extending outwardly from side wall 62. Large lock recesses 67 are formed in side wall 62, as shown. Small lock tabs 68 extending inwardly from side wall 62. A cover unlocking tab 69 extends outwardly from that portion of flange 64 located in the rounded corner of cover piece 60.

Figure 6:
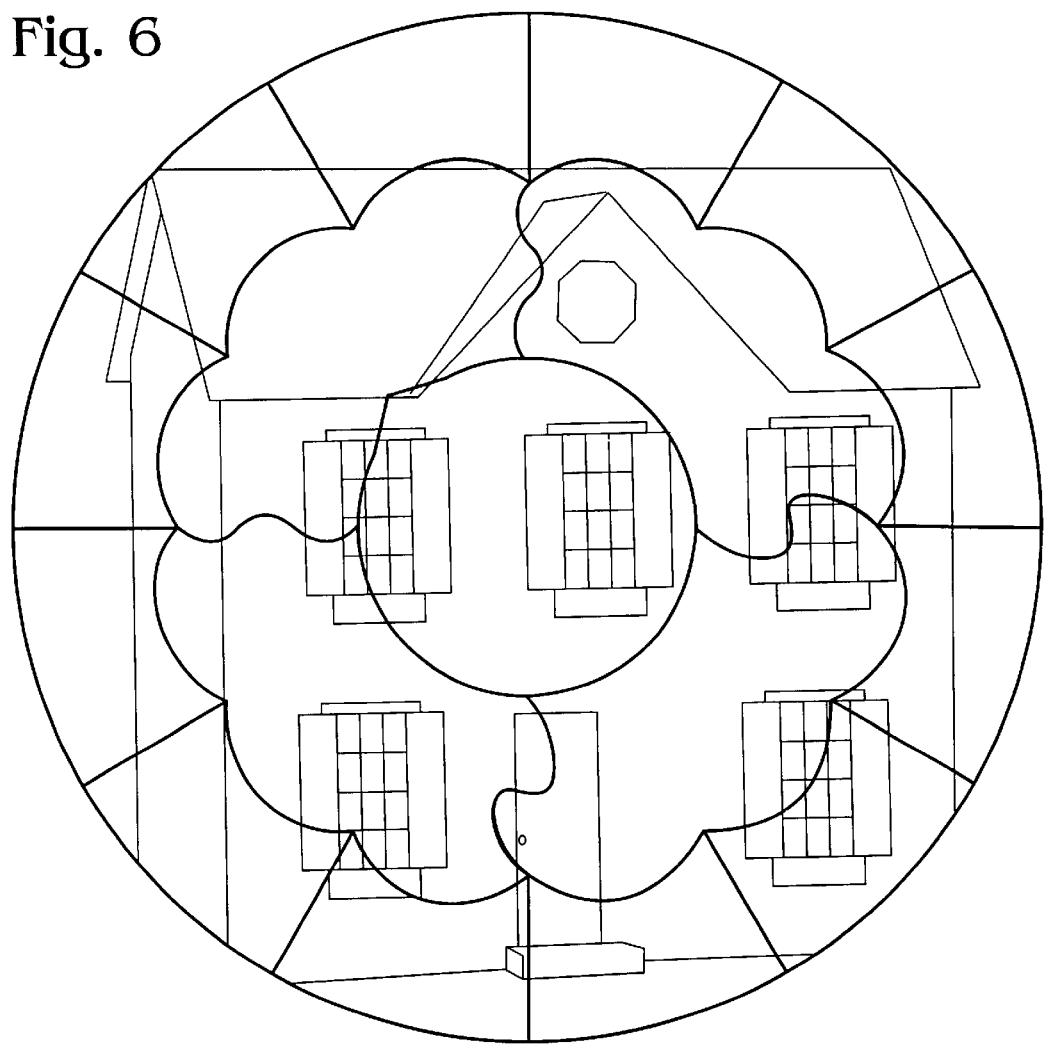
FIG. 6 is a bottom plan view of the arithmetic jigsaw puzzle of the present invention, illustrating a picture contained on that side of the puzzle opposite the side of the jigsaw puzzle having the arithmetic questions and answers thereon.

To check the accuracy of the answers, transparent cover piece 60 would be snapped into place over transparent tray 50 to hold the puzzle pieces in place, and the container formed by tray 50 and top 60 turned over to inspect the picture appearing on the reverse side of the puzzle, such as, for example, the picture shown in FIG.6. If the picture is correctly shown it means that all of the arithmetic questions have been answered correctly. If the picture is not correctly shown it means that two or more of the arithmetic questions has been answered incorrectly, and the puzzle can be reviewed and answer pieces 40 moved to correct erroneous answers.

By "picture" it is intended to include any visual representation that would be perceived as being correct if all of the answer pieces 40 have been properly placed radially adjacent the arithmetic questions, and would be perceived as incorrect if two or more of the answer pieces 40 have been improperly placed radially adjacent the arithmetic questions. Such visual representations include, but are not limited to, any two dimensional work of fine, graphic or applied art, photographs, prints, art reproductions, maps, charts, technical drawings, diagrams, etc.

It is preferable to print a unique background pattern to each of the puzzles 10 so that pieces from one puzzle aren't inadvertently mixed in with pieces from another puzzle. Such patterns can be in color or black and white, and are a matter of infinite choice. Examples of such patterns have not been shown in the drawings for sake of clarity.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A circular, essentially two-dimensional jigsaw puzzle for practicing arithmetic, said jigsaw puzzle being formed of a plurality of interfitting pieces, said jigsaw puzzle and each of said pieces having first and second planar surfaces, said plurality of interfitting pieces including:

a circular center piece containing a plurality of substantially evenly spaced apart operand numbers located on said first planar surface adjacent its periphery;

a plurality of irregularly shaped middle ring question pieces encircling said circular center piece, said middle ring question pieces adapted to interfit with said circular center piece and with each other in only a single configuration, each of said middle ring question pieces having at least one arithmetic question located on said first planar surface thereof, said arithmetic question being in the form of an arithmetic operator sign followed by an operator number and an equal sign, each of said arithmetic questions being in radial alignment with an associated one of said operand numbers located on said circular center piece;

a plurality of identically shaped outer ring answer pieces encircling said middle ring question pieces, each of said outer ring answer pieces having a single answer number located on said first planar surface thereof, each of said outer ring answer pieces adapted to interfit with each other and with each and every one of said middle ring question pieces with said answer number located on said answer piece being in radial alignment with one of said arithmetic questions and its associated radially aligned operand number; and a picture located on said second planar surface of said jigsaw puzzle.

2. The jigsaw puzzle of claim 1 wherein each of said arithmetic questions located on said middle ring question pieces are identical.

3. The jigsaw puzzle of claim 2 wherein each of said middle ring question pieces has three arithmetic questions located on said first planar surface thereof.

4. The jigsaw puzzle of claim 1 wherein there are four middle ring question pieces.

5. The jigsaw puzzle of claim 1 wherein said center piece has a locking member extending therefrom, and one of said middle ring question pieces has a recess located therein, said recess adapted to interfit with said locking member.

6. A puzzle set including a plurality of circular, essentially two-dimensional jigsaw puzzles for practicing arithmetic, each of said jigsaw puzzles in said set being formed of a plurality of interfitting pieces, each of said jigsaw puzzles and each of its pieces having first and second planar surfaces, each of said puzzles having a plurality of interfitting pieces including:

a circular center piece containing a plurality of substantially evenly spaced apart operand numbers located on said first planar surface adjacent its periphery;

a plurality of irregularly shaped middle ring question pieces encircling said circular center piece, said middle ring question pieces adapted to interfit with said circular center piece and with each other in only a single configuration, each of said middle ring question pieces having at least one arithmetic question located on said first planar surface thereof, said arithmetic question being in the form of an arithmetic operator sign followed by an operator number and an equal sign, each of said arithmetic questions being in radial alignment with an associated one of said operand numbers located on said circular center piece, each of said arithmetic questions located on said middle ring question pieces being identical;

a plurality of identically shaped outer ring answer pieces encircling said middle ring question pieces, each of said outer ring answer pieces having a single answer number located on said first planar surface thereof, each of said outer ring answer pieces adapted to interfit with each other and with each and every one of said middle ring question pieces with said answer number located on said answer piece being in radial alignment with one of said arithmetic questions and its associated radially aligned operand number;

a picture located on said second planar surface of said jigsaw puzzle;

all of said puzzles in said set having arithmetic questions selected from the group consisting of addition questions, subtraction questions, multiplication questions and division questions, said group not including mixtures thereof.

7. The puzzle set of claim 6 wherein there are ten jigsaw puzzles, said operator number for each said jigsaw puzzle is selected from the group consisting of 1, 2, 3, 4, 5, 6, 7, 8, 9, and 10, and there are no duplicate operator numbers amongst the ten jigsaw puzzles.

8. The puzzle set of claim 7 wherein each of said middle ring question pieces in each said jigsaw puzzle has three arithmetic questions located on said first planar surface thereof.

9. The puzzle set of claim 8 wherein there are four middle ring question pieces in each said jigsaw puzzle.

10. The jigsaw puzzle of claim 6 wherein the center piece of each of said jigsaw puzzles has a locking member extending therefrom, and one of said middle ring question pieces has a recess located therein, said recess adapted to interfit with said locking member.

11. A container including a transparent tray and a transparent cover removably attached to said transparent tray, a circular, essentially two-dimensional jigsaw puzzle for practicing arithmetic located within said container, said jigsaw puzzle being formed of a plurality of interfitting pieces, said jigsaw puzzle and each of said pieces having first and second planar surfaces, said plurality of interfitting pieces including:

a circular center piece containing a plurality of substantially evenly spaced apart operand numbers located on said first planar surface adjacent its periphery;

a plurality of irregularly shaped middle ring question pieces encircling said circular center piece, said middle ring question pieces adapted to interfit with said circular center piece and with each other in only a single configuration, each of said middle ring question pieces having at least one arithmetic question located on said first planar surface thereof, said arithmetic question being in the form of an arithmetic operator sign followed by an operator number and an equal sign, each of said arithmetic questions being in radial alignment with an associated one of said operand numbers located on said circular center piece;

a plurality of identically shaped outer ring answer pieces encircling said middle ring question pieces, each of said outer ring answer pieces having a single answer number located on said first planar surface thereof, each of said outer ring answer pieces adapted to interfit with each other and with each and every one of said middle ring question pieces with said answer number located on said answer piece being in radial alignment with one of said arithmetic questions and its associated radially aligned operand number; and a picture located on said second planar surface of said jigsaw puzzle;

said second planar surface of said jigsaw puzzle facing said transparent tray of said container, and said first planar surface of said jigsaw puzzle facing said transparent cover of said container.

\* \* \* \* \*